United States Patent [19]

Ishikura

[11] 4,417,287
[45] Nov. 22, 1983

[54] HELICAL SCAN VIDEO TAPE RECORDER HEAD START-UP

[75] Inventor: Masao Ishikura, Akigawa, Japan

[73] Assignee: Hitachi Denshi Kabushiki Kaisha, Tokyo, Japan

[21] Appl. No.: 315,907

[22] Filed: Oct. 28, 1981

[30] Foreign Application Priority Data

Oct. 29, 1980 [JP] Japan .................................. 55-150778

[51] Int. Cl.³ ............................................. G11B 21/04
[52] U.S. Cl. ......................................... 360/71; 360/75
[58] Field of Search .................................. 360/71, 75

[56] References Cited

U.S. PATENT DOCUMENTS 3,916,441 10/1975 Jones ...................................... 360/71
4,011,588 3/1977 Yasuda et al. ......................... 360/71

FOREIGN PATENT DOCUMENTS 2066987 7/1981 United Kingdom .................. 360/71

Primary Examiner—George G. Stellar

Attorney, Agent, or Firm—Oblon, Fisher, Spivak, McClelland & Maier

[57] ABSTRACT

A helical scan type video tape recorder, in which the wrap-around angle of the magnetic tape around the revolving drum is relatively large, provides fluctuations to the drum motor start-up torque and the reel motor torque for performing start-up of the revolving head drum with magnetic tape wrapped therearound when the recorder is operated in the stand-by mode. Fluctuations in the drum motor start-up torque and those in the reel motor torque are mutually synchronized in opposite directions, whereby when one is stepped up for increase in the revolving head drum start-up torque, tension in the magnetic tape wrapped around the drum is weakened, and conversely when the revolving head drum torque is decreased, tension in the magnetic tape is strengthened, thereby assuring start-up operations of the revolving head drum even when adherence has occurred between the magnetic tape and the revolving head drum.

5 Claims, 5 Drawing Figures

HELICAL SCAN VIDEO TAPE RECORDER HEAD START-UP

BACKGROUND OF THE INVENTION

This invention relates to a helical scan type video tape recorder capable of providing reliable start-ups of its revolving head drum.

Recently, for video tape recorders (hereinafter called VTRs), helical scan type VTRs have come to be widely employed, and are thus used in large quantities, not only as consumer oriented models, the so-called home VTRs, but also as open reel type helical scan VTRs using 1 inch wide magnetic tape for broad-casting and other professional applications.

This type of helical scan VTR is not only comparable in performance capabilities to conventional 4 head type VTRs, but is characterized by relative simplicity of structure and ease in attaining small size and light weight. On the other hand, it tends to present a problem in that the magnetic tape sticks to the revolving head drum (hereinafter called the drum), making start-up of the drum difficult.

FIG. 1 shows an example of the magnetic tape transport path configuration in such helical scan type VTRs as described above.

In the figure, 1 denotes a magnetic tape; 2, a drum; 3, guide posts; 4, a supply-side tension post; 5, a take-up-side tension post; 6, a supply reel; and 7, a take-up reel.

The magnetic tape 1 from the supply reel 6 is caused to run around the periphery of the drum 2 by a multitude of guide posts 3, and at this time is caused to wrap around the drum 2 in a nearly complete circle, attaining a wrap-around angle to the drum 2 of as much as 344°. When the magnetic tape 1 and the drum 2 are at a standstill, these tend to stick together, as a result of which start-up of the drum 2 becomes impossible.

VTRs of this kind are frequently used out-doors and in other variable environmental conditions as portable VTRs, through utilization of their advantageous small size and light weight, so that variations in humidity and temperature are liable to cause dew condensations on the surface of the drum 2, leading to the adherence phenomenon mentioned above.

Then, when adherence occurs and the drum 2 cannot be started up, the VTR naturally becomes unusable, a highly undesirable situation for professional VTRs required to be reliably operable at all times. Even in such circumstances it is desirable to be able to start up the drum 2.

For helical scan type VTR motor control systems heretofore, those structured, for example, as shown in FIG. 2, have been employed.

In the figure, 10 denotes a phase comparator; 11, an adder; 12, a switching circuit to select between start-up and stopping of the drum; 13, an error voltage amplifier; 14, a motor driving amplifier; 15, a drum motor; 16, a revolution detector; 17, a frequency discriminator; 18, a reel motor; 19, a motor driving amplifier; and 20, a designated-voltage controller.

Then, a denotes a drum start command signal that is supplied when controlled in a stand-by mode; h, a terminal voltage of the drum motor 15; i, a terminal voltage of the reel motor 18; m, a speed error signal; n, a detection signal by the detector 16; y, a reference signal; and c, a phase error signal.

In such helical scan VTRs, stand-by mode controls are employed prior to recording, reproducing, and other operations of the VTR, and in the stand-by mode only the drum is revolving while the magnetic tape is at stand still with a weak tension applied thereto to prevent slackening.

Now, if the VTR is operated in the stand-by mode, and a drum start command signal a is generated, the switch circuit 12 is switched to the illustrated state, that is, the mobile contact point (1) is switched to the fixed contact point (3), and signals from the error voltage amplifier 13 are supplied to the motor driving amplifier 14. At this time, as the number of revolutions of the drum motor 15 is zero and the detection signal n of the revolution detector 16 is consequently also zero, a relatively great voltage h is generated out of the motor driving amplifier 14 and is supplied to the drum motor 15. By this, the drum motor 15 is started up, whereby a detection signal n is generated by the revolution detector 16 and is supplied to the phase comparator 10 and the frequency discriminator 17, and the phase error signal c, obtained through phase comparision with the reference signal y, and the speed error signal m obtained through frequency discrimination, are supplied via the adder 11 to the error voltage amplifier 13, so that phase servo control and speed servo control are exercised, and the phase and the number of revolutions of the drum motor 15, and consequently of the drum 2, are controlled to meet a predetermined condition.

Meanwhile, a terminal voltage i that corresponds to the voltage designated by the voltage controller 20 is supplied simultaneously with the above to the reel motor 18 by the motor driving amplifier 19, whereby a relatively weak designated tension is applied to the magnetic tape to prevent slackening thereof.

Now, suppose that when the VTR is thus operated in the stand-by mode, and the above mentioned adherence of the magnetic tape to the drum occurs, the drum will then not start up, and, in the meantime, only the terminal voltage h that corresponds to a zero number of revolutions is continuously applied to the drum motor 15, and no specific operation of any kind to urge start-up of the drum motor 15 is performed.

Consequently, in the conventional VTRs, there exists the disadvantage that unless, by some method, adherence of the magnetic tape to the drum is removed, operation of the VTR cannot commence.

A method has been proposed to eliminate this disadvantage, whereby when, under the stand-by mode operation, despite provision of a voltage to the drum motor, the drum motor does not revolve, the voltage impressed on the drum motor is switched off and on a plurality of times, thereby urging start-up thereof.

However, even by this method, depending on conditions of the adherence, the drum motor is not always able to be made to start up, and the method is thus disadvantageous in not being capable of providing reliable start-ups at all times.

SUMMARY OF THE INVENTION

It is therefore an object of the present invention to eliminate the disadvantages of prior art as described in the foregoing, and to provide helical scan type VTRs where start-up of the drum motor is possible at all times under any environmental conditions.

To attain this objective, this invention is characterized in that when operated in the stand-by mode, and the drum motor does not revolve after a predetermined voltage is supplied to the drum motor, the terminal voltage of the drum motor is switched on and off, thereby providing fluctuations in the torque thereof, and, additionally, the voltage supplied to the reel motor is also switched off and on, thereby providing the magnetic tape tension with fluctuations that are opposite to the fluctuations provided to the torque of the drum motor.

According to this invention, as start-up can be performed with certainty even when the magnetic tape is in a state of adherence to the drum, the disadvantage in prior art is eliminated and characteristic properties of the helical scan type VTR can fully be utilized, thereby providing helical scan type VTRs for professional use that are sufficiently reliable even in portable applications.

DETAILED DESCRIPTION OF THE PREFERRED EMBODIMENTS

Explained below with reference to the drawings is an embodiment of the helical scan type VTR in accordance with this invention.

Figure 2:
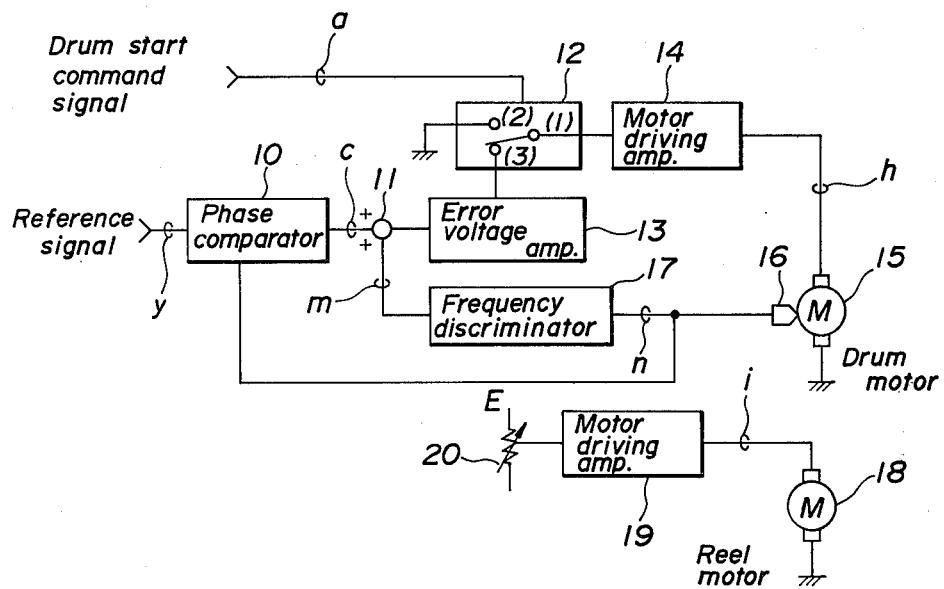
FIG. 2 is a block diagram showing an example of a conventional motor control system for the helical scan type VTR.
Figure 3:
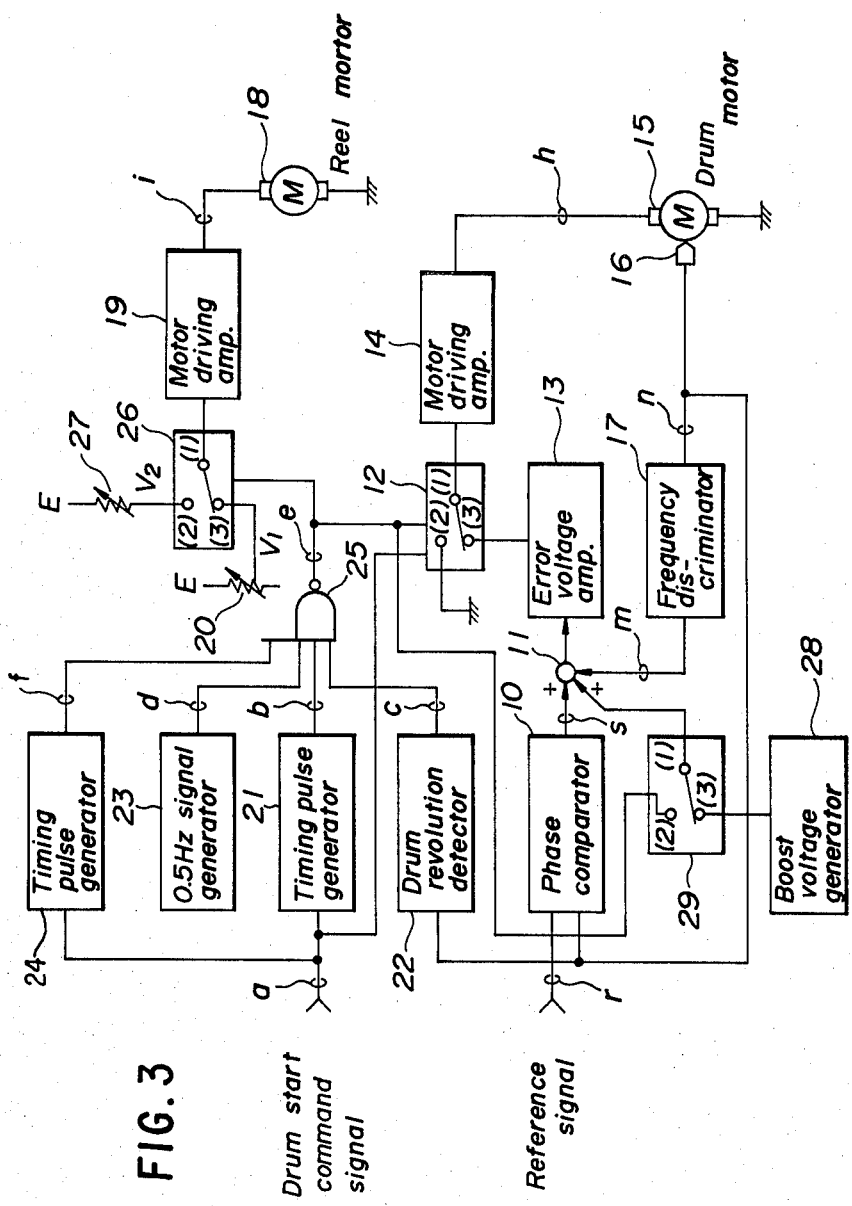
FIG. 3 is a block diagram shoing an example of a motor control system for the helical scan type VTR in accordance with this invention.

FIG. 3 is a block diagram showing an example of a motor control system of a helical scan type VTR according to the present invention and the same reference numerals are employed for the same or equivalent parts as in the conventional example in FIG. 2, so that detailed explanations thereof have been omitted.

In the figure, 21 denotes a timing pulse generator that is triggered by the drum start command signal and generates a timing signal b in approximately 3 seconds thereafter, 22 is a drum revolution detector that generates a drum revolution signal c by the detection signal n, 23 is a 0.5 Hz signal generator that generates a 0.5 Hz square wave signal d, 24 is a timing pulse generator that is triggered by the signal a and generates a timing signal f in approximately 10 seconds thereafter, 25 is a 4-input NAND gate that inputs the signals b, c, d, and f, and outputs a signal e, 26 is a switching circuit that switches the input of the motor driving amplifier 19 between $V_1$ and $V_2$, 27 is a voltage controller that designates the voltage $V_2$, 28 is a boost voltage generator for providing the drum motor 15 with a terminal voltage h that is greater than the terminal voltage in a steady state, and 29 is a switching circuit that is operated by the signal e.

Operations of this embodiment will now be explained with reference to the timing charts in FIG. 4 and FIG. 5.

When being operated in the stand-by mode, as the drum start command signal a falls, the switching circuit 12 is switched to the state shown in the figure, so that the terminal voltage h is supplied to the drum motor 15, and at the same time the switching circuit 26 is also switched to the state shown in the figures, so that a voltage i whose magnitude is $V_1$ is supplied to the reel motor 18, thereby performing start-up of the drum motor 15 in a similar manner to the conventional example in FIG. 2. Then, if the drum motor 15 starts revolving within approximately 3 seconds of supply of the terminal voltage h, the detection signal n emerges from the revolution detector 16 so that the revolution signal c attains level 1, as shown in FIG. 4, causing the output signal e of the NAND gate 25 to be raised to level 1, as shown in the said figure, by the timing signal b at the time of operations entering a stand-by mode, and thereafter is maintained at level 1 by the revolution signal c.

Accordingly, the interim, the switching circuits 26 and 29 are switched to the state shown in the figures, so that the terminal voltage h that corresponds to the boost voltage supplied to the motor driving amplifier 14 via the adder 11 and the error voltage amplifier 13 by the boost voltage generator 28, is supplied to the drum motor 15 thereby quickly completing its start-up.

Figure 1:
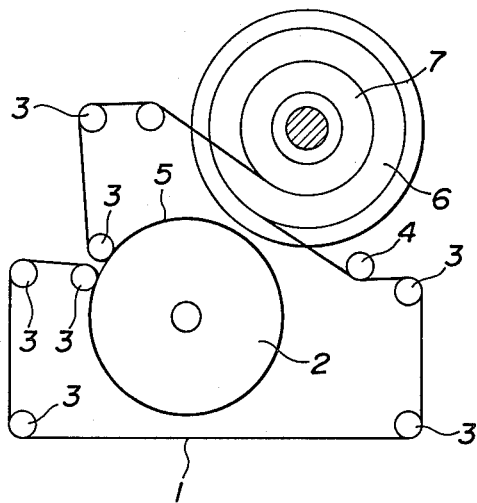
FIG. 1 is a schematic diagram showing an example of the magnetic tape transport paths of a helical scan type VTR.
Figure 5:
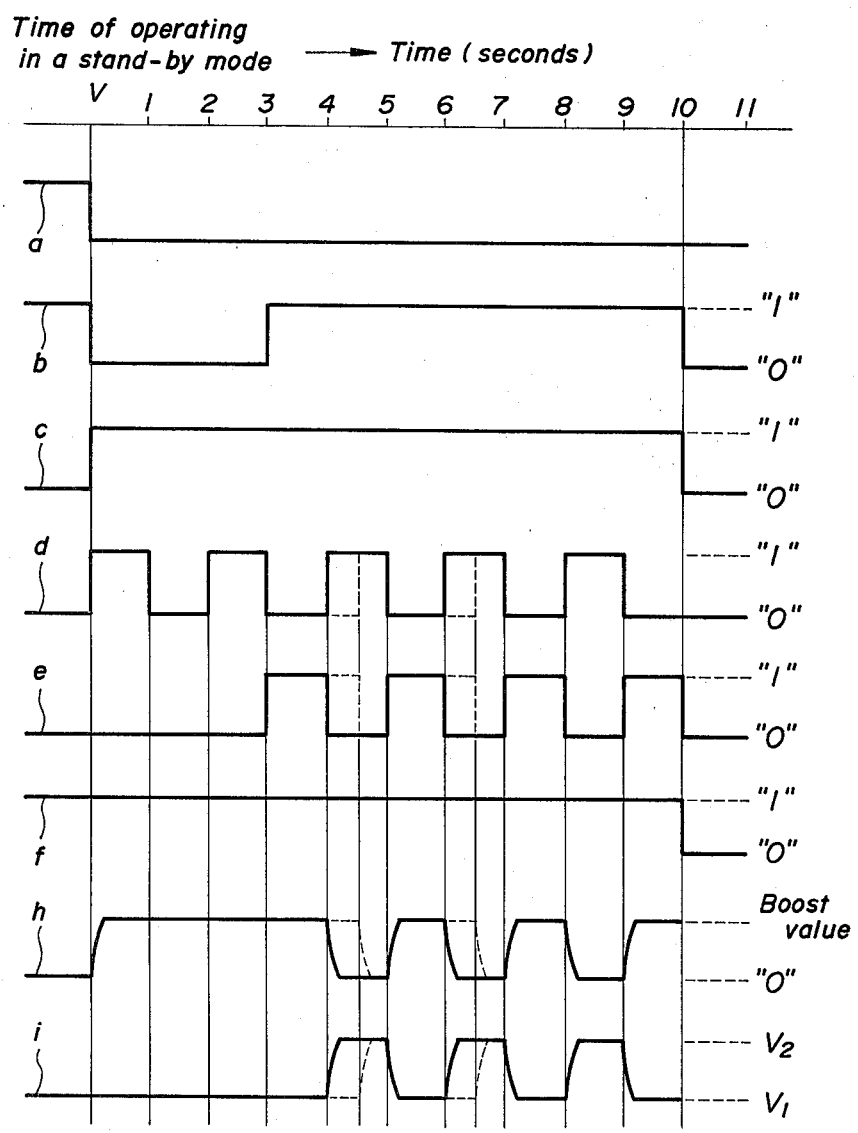

However, if adherence has occurred beween the magnetic tape 1 (FIG. 1) and the drum 2, and, at the time of operations entering the stand-by mode, the switching circuit 12 is switched to the state shown, thereby providing the terminal voltage h to the drum motor 15, and approximately 3 seconds elapse without the drum motor 15 starting up, the revolving signal c will not fall to level 0 so that, as shown in FIG. 5, the signals c, b, and f among the input signals to the NAND gate 25 all attain level 1. At this time, the square wave signal d is generated by the 0.5 Hz oscillator 23, and is supplied to the input of the NAND gate 25, so that, as shown in FIG. 5, the output signal e will be generated at the output of this gate 25 in approximately 3 seconds after entrance of operations into the stand-by mode.

Then, as the switching circuits 12, 26 and 29 are controlled by this output e, the terminal voltage h being supplied to the drum motor 15 is alternately switched on and off at one second intervals as shown in FIG. 5, and simultaneously the voltage i is also switched alternately between $V_1$ and $V_2$. At this time, as is clear from the waveforms h and i in FIG. 5, it has been arranged that when the terminal voltage h of the drum motor 15 is on, the voltage i of the reel motor 18 is reduced to $V_1$, and when the terminal voltage h of the drum motor 15 is off, the voltage i of the reel motor 18 is raised to $V_2$.

As a result, when the force trying to revolve the drum 2 attains its maximum level, tension on the magnetic tape 1 is weakened, and, conversely, when the force trying to revolve the drum 2 is at its minimum level, tension on of the magnetic tape 1 is strengthened. The situations alternate repeatedly every second, providing a sort of rocking to portions of the magnetic tape 1 adhering to the drum 2.

Now, the adherence condition of the magnetic tape 1 to the drum 2 generally is far from a stable state. Rather, it is a highly unstable state caused by a combination of various factors, so that with the above described rocking applied thereto, the factors that previously contributed to the adherence vary, and the adherence can eventually be eliminated.

Figure 4:
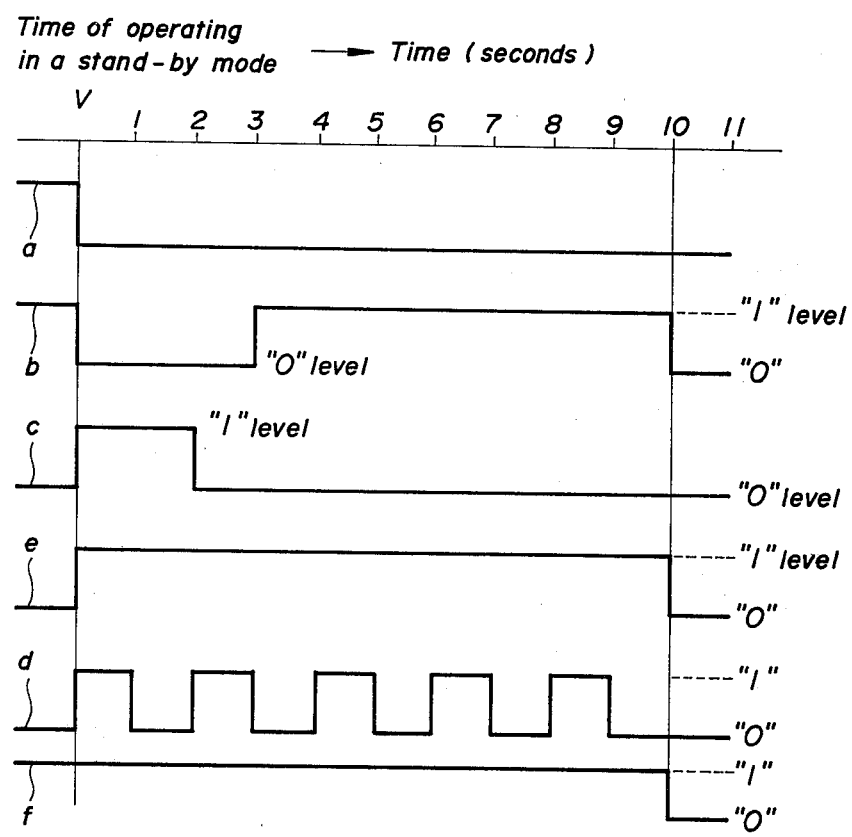
FIG. 4 and FIG. 5 are timing charts for explaining the operations of the helical scan type VTR according to the present invention.

Accordingly, the drum motor 15 starts up, thereby causing the detection signal n to emerge from the revolution detector 16 and the revolution signal c to fall to level 0, and the output signal e of the NAND gate 25 attains level 1, leading to the state shown in FIG. 4 and completing the start-up.

Thus, in the embodiment of this invention, after being operated in the stand-by mode, if the drum motor 15 does not start up in approximately 3 seconds, the terminal voltage h of the drum motor 15 is switched on and off every second, providing fluctuations in the torque, while at the same time the voltage i of the reel motor 18 is also switched between $V_1$ and $V_2$ synchronized with the torque fluctuations in the drum motor 15, and tension in the magnetic tape 1 is fluctuated in the opposite directions to the increase and decrease of the torque, whereby the drum motor 15 can be started up even when adherence has occurred between the magnetic tape 1 and the drum 2.

Furthermore, as cases could exist where the drum motor 15 will not start up somehow, the timing pulse generator 24 is provided which supplies the NAND gate 25 with the signal f that falls to level 0 after approximately 10 seconds, to complete the above described operation in approximately 10 seconds. The stand-by mode, therefore, may also be reset utilizing this signal f.

In the embodiment shown in FIG. 3, as is clear from FIGS. 4 and 5, the square wave signal d, being the output of the 0.5 Hz signal generator 23, has an equal length of period when it is at level 1 and when it is at level 0, i.e., it is a signal with a 1:1 duty ratio.

However, by modifying this signal to have the waveform shown by the broken lines in FIG. 5, the voltage h can be endowed with the waveform shown in the same figure, where the terminal voltage h of the drum motor 15 remains on longer than off, as a result of which the torque fluctuating state of the drum motor 15 can be sustained longer at the maximum torque and shorter at the minimum torque, thereby further enhancing the rocking effect described in the foregoing and making the start-up even surer.

Also, in the foregoing embodiment, the boost voltage generator 28 and the switching circuit 29 have been provided, to supply a higher voltage to the drum motor 15, which still further facilitates start-ups in states of adherence.

What is claimed is:

1. A helical scan type video tape recorder having a revolving drum equipped with magnetic heads, comprising: means to create fluctuations in the starting torque for the revolving head drum motor; and means to simultaneously create fluctuations in the torque for a reel motor at the time of start-up of said revolving drum for fluctuating the tension in the magnetic tape in synchronization with the fluctuations in the starting torque for said drum motor, thereby assuring execution of start-up of said revolving drum.

2. A helical scan type video tape recorder as claimed in claim 1, wherein said means to create fluctuations in the starting torque for said drum motor comprises means to switch the terminal voltage of said drum motor alternately to a boost voltage and a zero voltage.

3. A helical scan type video tape recorder as claimed in claim 1, further comprising means to detect the start of revolutions of said revolving drum and means to abort start-up operation when start-up of said revolving drum is not completed within a predetermined length of time after initiation of operations for start-up of said revolving drum.

4. A helical scan type video tape recorder having a revolving drum equipped with magnetic heads, comprising a first timing signal generator which is triggered by a drum start command signal and operates at a predetermined timing; a second timing signal generator which is triggered also by said drum start command signal and operates at a predetermined timing that is longer than that of said first timing signal generator; a square wave signal generator which generates square signals with a predetermined frequency; a first switching circuit that switches the drum motor driving voltage; a second switching circuit which switches the reel motor driving voltage; and a drum revolution detector which detects revolution of said drum; means for operating said first and second switching circuits by a signal from said square wave signal generator to provide fluctuations to the drum motor, only when subsequent to generation of a timing signal by said first timing signal generator but prior to generation of a timing signal by said second timing signal generator, when no detection output of said drum revolution detector is obtained.

5. A helical scan type video tape recorder as claimed in claim 4, wherein the duty ratio of the square wave signal from said square wave signal generator is other than 1 to 1, and means providing that the torque fluctuating status provided thereby to said drum motor is continued for a long period of time when torque is increased, and is continued for a short period of time when said torque is reduced.

* * * * *